Patented Dec. 15, 1942

2,305,497

UNITED STATES PATENT OFFICE 2,305,497

COATING COMPOSITION AND ARTICLE COATED THEREWITH

Alfred L. Rummelsburg, Wilmington, Del., assignor to Hercules Powder Company, Wilmington, Del., a corporation of Delaware No Drawing. Application June 29, 1940, Serial No. 343,166

14 Claims. (Cl. 106—173)

This invention relates to a transparent wrapping sheet and, more particularly, to a transparent wrapping sheet of regenerated cellulose provided on one or both sides with a coating composition comprising a cellulose derivative, such as cellulose nitrate and a polymerized rosin of low acid number.

Transparent wrapping sheets have heretofore been provided with surface films of cellulosic derivative compositions, such as compositions of cellulose nitrate, a resin and a plasticizer and, where moisture-proofness is desired, a wax or waxy material, the purpose of this coating being to enhance the utility and appearance of the wrapping sheet and to impart to it the desired resistance to transmission of water either in liquid or in vapor form. Rosin and ester gum have been commonly employed as the resin in such coating compositions. However, both rosin and ester gum possess certain disadvantages when used in this connection, and the finding of a resin which would satisfactorily replace rosin ester gum has long been a matter of need in the industry. In order to be successful, a resin which will replace rosin and ester gum must have the desired compatibility with the cellulose nitrate or other cellulose derivative employed as the principal film forming constituent, and likewise adequate compatibility with the wax or waxy material and with the plasticizer where such are employed in the lacquer. In addition, the resin must have sufficient flexibility over a wide range of temperature and humidity conditions, must impart the desired strength and flexibility to the final material, must be soluble in the ordinary lacquer solvents, must be relatively non-tacky and not pick up dust in the dried film, must not be unduly expensive, must have characteristics which permit the securing of a lacquer of high solids content applicable to the regenerated cellulose sheet by the ordinary coating methods, such as, roll coating, brushing, spraying, and the like, must enhance the gloss and luster of the lacquer film, and must increase the adhesion of the film of lacquer to the underlying sheet of regenerated cellulose or the like. In addition, a suitable resin must possess certain other characteristics well known to those skilled in the art. Among these is the requisite that the resin yields a film which is clear and haze-free even after the expiration of a long period of time.

It is an object of the present invention to provide a transparent base material such as regenerated cellulose wrapping sheeting with an improved lacquer.

Another object is to provide an improved lacquer for application to transparent bases such as regenerated cellulose sheeting.

Another object is to provide transparent wrapping sheeting with an improved lacquer containing a resin which overcomes, to a large extent, the disadvantages of rosin and ester gum and, in addition, provides numerous advantages over the previously employed resins.

Another object is to provide a permanently haze-free transparent wrapping sheet.

Another object is to provide a lacquer for application to a transparent base, which lacquer has the characteristic of forming a film which is haze-free and which remains haze-free for the life of the sheeting.

Numerous other objects of the present invention will more fully hereinafter appear.

In accordance with the present invention, the transparent base, which is insoluble in the usual lacquer solvents, is coated with a coating composition comprising a cellulose derivative and a polymerized rosin having an acid number of less than 140. I have discovered that by the employment in the lacquer of a polymerized rosin having an acid number below 140, there is produced a film which is haze-free and which remains haze-free. Use of polymerized rosin of an acid number below 140 overcomes, to a large extent, the disadvantages attendant upon the use of rosin or ester gum as the resinous constituent of the lacquer and, at the same time, give rise to advantages not heretofore attainable. I have found that polymerized rosins of high acid number, that is above 140, give rise to the formation of haze in the dried lacquer film and accordingly are disadvantageous.

It is preferred to employ polymerized rosin having an acid number below 135, since such use completely insures against the formation or development of a haze in the lacquer film. Furthermore, it is preferred to employ polymerized rosin having an acid number of at least 100, since otherwise many of the advantages are not attained. Accordingly, the preferred range of acid number is from about 100 to about 135.

The lacquer in accordance with the present invention may comprise a cellulosic derivative and the polymerized rosin of low acid number as its principal film forming ingredients, but may embody in addition substantial proportions of a wax or waxy material and a plasticizer of suitable type. The present invention is deemed to comprise the new article of manufacture in the form of a transparent base provided with a haze-free film, containing a low acid number polymerized rosin, and the lacquer or coating composition containing the low acid number polymerized rosin.

In accordance with the present invention, there is first prepared the lacquer which comprises the film-forming ingredients which are relatively non-volatile dissolved in a suitable quantity of a suitable volatile organic solvent. The resulting lacquer is then applied either to the transparent base as for example to one or both sides of a transparent wrapping sheet of regenerated cellulose in any suitable manner as, for example, by roll coating, spraying, brushing, flowing, etc., after which the wet film is dried to remove the volatile solvents and form the final product. If desired, the coated base may be subjected to an elevated temperature sufficient to melt the wax in the composition and simultaneously volatilize the solvent whereby a film of improved transparency and moisture-proof qualities is obtained, As the transparent base to which the lacquer is applied, I may use any transparent base which is preferably insoluble in the usual lacquer solvents such as glass, transparent regenerated cellulose articles such as regenerated cellulose sheeting, gelatin sheeting, casein sheeting, cellulose acetate sheeting, rubber hydrochloride sheeting, etc. However, the invention is particularly applicable to regenerated cellulose sheeting because such sheeting without lacquer coating is extremely lustreless and permeable to the transmission of water or water vapor.

As the cellulose derivative, it is preferred to employ nitrocellulose of a grade which gives the desired viscosity in the resulting lacquer. Mixtures of several grades of nitrocellulose of different viscosity may be used if desired. I have found it particularly advantageous to employ nitrocellulose of one-half second viscosity. Instead of using nitrocellulose other cellulose derivatives may less preferably be employed, such as ethyl cellulose, benzyl cellulose, cellulose acetate, cellulose acetate butyrate, cellulose acetate propionate, and the like.

The range of cellulose derivative may vary within quite wide limits, for example, from about 25% to about 60% by weight of total solids in the composition, although it is preferred to employ between 40 and 50% of nitrocellulose.

The polymerized rosin of low acid number may be made by a number of various methods. The rosin may be polymerized by means of treatment with concentrated sulfuric acid, boron trifluoride, phosphoric acid, aqueous or anhydrous hydrogen fluoride, aluminum chloride, stannic chloride, etc. Methods of polymerizing rosin to obtain a polymerized product of the desired low acid number are given in the several examples below. In general, by suitably modifying the known processes for polymerizing rosin and carrying out the polymerization under specific conditions, there may be obtained a polymerized product having the desired acid number. I have found that it is undesirable to carry the polymerization beyond the point where the acid number of the product is 100, since the resulting lacquer film loses many of its desirable characteristics. There are disclosed in my Patent No. 2,108,928 several examples which give an acid number falling within the range of the present invention. Likewise, there is disclosed in my Patent No. 2,136,525, in Example 6, a product having an acid number within the preferred range and in Example 8 a product having an acid number falling within the less preferred range of the present invention.

I have further found that by suitable modification of the polymerizing conditions disclosed in U. S. patent to Morton, No. 2,017,866 that I can produce a polymerized rosin having an acid number within the range of the present invention, although, when the process of Morton is carried out in accordance with the disclosure and examples given therein, the product has a high acid number and produces a very objectionable haze when incorporated into a lacquer film on regenerated cellulose or the like. For example, I have found that, by increasing the concentration of acid from that disclosed in Morton to 85% and by employing a longer reaction time (5 to 6 hours), there may be produced a polymerized rosin having an acid number of 126 and which gives a hazeless lacquer film. In addition, by the method of Grun and Winkler, Chem. Umschau, 26, 77-9 (1919) there may be produced a polymerized rosin having an acid number of 123 and a melting point of 97 (original having an acid number of 163 and a melting point of 80° C.) which, when incorporated into a regenerated cellulose lacquer, produces a haze-free film.

In general, the process of polymerization of rosin with sulfuric acid using benzene as a solvent is capable of achieving low acid number material which does not give a haze when the reaction period is greatly extended, say to 5 or 6 hours, or when the amount of catalyst is increased. However, since an extended reaction period is undesirable because it tends to produce a product of dark color, and since the use of an increased amount of sulfuric acid as the catalyst greatly reduces the yield of the product, such modifications of the benzol sulfuric acid process are generally unsatisfactory. Where the product is objectionably dark in color, it may be treated in solution in a volatile organic solvent with activated carbon, activated alumina, decolorizing clays such as acid activated clay, or the like to reduce the color to the desired figure.

If desired, and frequently it will be preferable, the polymerized rosin product may be subjected to reduced pressure distillation (for example at about 1 mm. pressure and a bath temperature of 240-280° C. or higher) to remove rosin oils and unpolymerized rosin from the product. In this way, the melting point of the product can be still further increased and tackiness eliminated. It will be appreciated that a lacquer film results in which the resin is of high melting point and which is free from any tackiness imparted.

In general, the polymerized rosin employed in carrying out the present invention is characterized by an acid number of at least about 100 and less than 140 and preferably ranging from about 100 to about 135, and a melting point ranging from about 15° to about 60° C. above the melting point of ordinary rosin (usually about 80° C.) and, in the case where unpolymerized rosin and rosin oil are removed by distillation, by a melting point of at least 50° C. above the melting point of the original ordinary rosin. The rosin subjected to polymerization may be either wood or gum rosin, or a mixture of both.

The amount of polymerized rosin of low acid number used in the composition may vary within relatively wide limits, as for example, from about 20 to about 60% by weight of the total solids in the lacquer. Within this range, it is preferred to employ between about 30 and about 40% by weight of low acid number polymerized rosin. It has been found that when low acid number polymerized rosin is used in the lacquer in these ranges, it produces a film which completely overcomes the disadvantages of the prior art lacquers. The polymerized rosin of low acid number is completely compatible with the cellulose derivative, and with the wax or waxy material used in the formula, both in the formulation and in the lacquer after application and evaporation of the solvent.

It is preferred to employ a wax or wax-like material in the lacquer composition in order to impart moisture-proof properties to the wrapping sheet coated with the lacquer. In this specification and in the claims appended hereto, I use the term wax to designate any suitable wax, such as the true waxes, or paraffin wax, or equivalent waxy and wax-like materials which have the property of imparting water-proofness to the lacquer containing them. It is preferred to use paraffin wax of relatively high melting point (at least 55° C.). However, other waxes may be employed such as for example a carnauba wax, spermaceti, wool wax, beeswax, Japan wax, Chinese insect wax, psylla wax, Montan wax, palm wax, sugar cane wax, pisang wax, candelilla wax, cottonseed wax, gondang wax, pimela wax, bayberry wax, etc. and similar waxy materials such as tallow waxy chlorinated naphthalenes (Halowax) palmitic acid, stearic acid, the mixture of stearic and palmitic acids known as stearin, ceresine, ozokerite, synthetic waxes, petroleum jelly, etc. The amount of wax employed may vary between about 1 and about 20% by weight of total solids in the lacquer and preferably within the limits of between about 5 and about 10% by weight. In some cases, a small amount of mineral oil, such as liquid petrolatum, or other wax crystallization inhibitor such as condensation product of chlorinated paraffin with naphthalene in the presence of aluminum chloride, may be incorporated in the mixture where wax such as paraffin wax is employed in order to prevent crystallization of the wax and resulting reduced transparency of the wrapping sheet.

It is preferable to incorporate into the lacquer a plasticizer of suitable type such as for example from 5 to 40% of one of the following plasticizers or mixtures thereof, the plasticizer employed being selected with reference to the particular cellulose derivative present in the formulation; dibutyl phthalate, dimethyl phthalate, diethyl phthalate, diamyl phthalate, cyclohexyl phthalate, benzyl phthalate, dibutyl tartrate, diamyl tartrate, ethyl abietate, benzyl abietate, diacetin, triacetin, sucrose octo-acetate, triethanolamine, acetanilide, methyl benzoate, ethyl benzoate, benzyl benzoate, phenyl benzoate, naphthyl benzoate, glyceryl benzoate, triethyl citrate, tributyl citrate, dibenzyl ether, butyl stearate, triphenyl borate, methyl phthalyl ethyl glycollate, butyl phthalyl butyl glycollate, ethyl phthalyl ethyl glycollate, triphenyl phosphate, tricresyl phosphate, camphor, blown castor oil, etc.

If desired, a suitable dye or soluble dyestuff may be incorporated in the lacquer provided it does not materially reduce the transparency of the lacquer or the film made therefrom.

The foregoing non-volatile constituents are dissolved in a suitable solvent therefor, it being preferred to employ mixtures of solvents, to form a lacquer of the desired consistency for application by the particular method to be used. Any of the known lacquer solvents may be employed. Particularly satisfactory results have been obtained by using a mixture of butyl acetate, ethyl acetate, ethyl alcohol, butyl alcohol and toluene in various proportions. The principles of formulating the lacquer solvent mixture are well understood to those skilled in the art, it being recognized that a solvent mixture should be employed which gives a suitable drying rate and which does not adversely affect the properties of the resulting solid film. It is particularly important to avoid condensation of moisture upon the lacquer film during evaporation of the solvents and to use solvents which do not cause blushing or clouding of the film as the solvents evaporate. As solvents, there may be employed any of the known lacquer solvents such as alcohols, ketones, esters, hydrocarbons, ethers, halogenated hydrocarbons, nitro paraffins, mixtures of the foregoing solvents, etc. The concentration of non-volatile or film-forming ingredients in the lacquer will depend upon the consistency desired and may vary, for example, from 10 to 50% and preferably from 20 to 25%. For example, I have found that use of a lacquer containing 22% of total solids results in a composition of such consistency that it may be readily applied by the usual coating methods to form a thin film which imparts the desired properties to the base.

In some cases the composition may be applied to the base in the form of the hot melt of the solids of the composition, no or only a very small amount of volatile organic solvent being employed.

Below are given several examples of illustrative embodiments of the invention. In Examples 1 to 4, the polymerized rosin employed was that prepared in accordance with Examples 5 to 13.

*Example 1*

|  | Parts by weight | Percentage of total solids |
| --- | --- | --- |
| Nitrocellulose (½ second) | 10 | 45.5 |
| Low acid number polymerized rosin | 8 | 36.3 |
| Dibutyl phthalate | 4 | 18.2 |
| Solvent | 78 |  |

The solvent employed in the above formulation had the following composition:

Percentage by weight
Butyl acetate _____ 25
Ethyl acetate _____ 5
Ethyl alcohol _____ 5
Butyl alcohol _____ 15
Toluene _____ 50

The lacquer was applied to one side of a regenerated cellulose sheet in the form of a thin film. After evaporation of the solvent there was obtained a regenerated cellulose sheet of high brilliance and gloss. The dried film was completely haze-free and did not exhibit haze even after a long period of time.

*Example 2*

The lacquer of Example 1 was applied to a smooth glass surface. The dried film exhibited permanent freedom from haze.

*Example 3*

|  | Parts by weight | Percentage of total solids |
| --- | --- | --- |
| Nitrocellulose (½ second) | 10 | 41.7 |
| Low acid number polymerized rosin | 8 | 33.3 |
| Paraffin wax (melting point 68° C.) | 2 | 8.3 |
| Dibutyl phthalate | 4 | 16.7 |
| Solvent (same as in Example 1) | 76 |  |

The lacquer was applied in the form of a thin, even film to the surface of a regenerated cellulose sheet. By evaporation, there was obtained a highly moisture-proof regenerated cellulose wrapping material of excellent transparency and brilliancy and which was permanently free from haze.

Example 4

The lacquer of Example 3 was applied to a glass surface. Upon evaporation, a haze-free film of excellent characteristics was obtained.

Example 5

To a solution of 260 g. I wood rosin in 521 g. gasoline (V. M. & P. naphtha) was added 70 g. 95% $H_2SO_4$ with vigorous agitation and cooling at 58–66° F. The mixture was agitated 1.5 hours, allowing the temperature to increase to 80° F. 500 c. c. water was then added during 20 minutes with vigorous agitation at 80° F. The gasoline solution was separated, water washed, and the solvent removed by distillation in vacuo. A 93% yield of polymerized rosin remained.

|  | Original rosin | Polymerized rosin |
|---|---|---|
| Acid number | 164 | 139 |
| Drop melting point °C | 80 | 101 |
| Color (Lovibond scale) | I | G |

Example 6

To a solution of 500 g. I wood rosin in 1000 g. benzene was added 40 g. gaseous $BF_3$ during 2 hours at 44–49° F. The homogeneous reaction mixture was allowed to stand at about 25° C. for about 18 hours. After water washing to remove catalyst, the polymerized rosin was recovered by distillation of the solvent in vacuo. The product had an acid number of 112, a drop melting point of 108° C., and a color of F.

Example 7

The procedure of Example 5 was duplicated and gave a product having an acid number of 137, a drop melting point of 101° C. and a color of G+.

Example 8

To 535 g. of a 60% solution of WW gum rosin in V. M. & P. naphtha was added 308 g. of 85% strength $H_2SO_4$ with vigorous agitation during 25 minutes at 86° F. Agitation was continued for 2¼ hours at 86° F. The reaction mixture was poured into 890 c. c. V. M. & P. naphtha with agitation. The naphtha solution was decanted from sludge, and water washed. The solvent was evaporated in vacuo.

|  | Original rosin | Polymerized rosin |
|---|---|---|
| Acid number | 163 | 126 |
| Drop melting point °C | 83 | 130 |
| Color | WW | WW |

Example 9

To a solution of 900 g. H wood rosin in 2100 g. V. M. & P. naphtha was added 225 g. 95% $H_2SO_4$ with vigorous agitation during 17 minutes at 85° F. The reaction mixture was agitated for a period of 1.5 hours at 85° F. 900 g. water was added with agitation during 0.5 hour. The aqueous acid was separated, and the naphtha solution washed with 2500 c. c. water containing 3% of NaCl to which 60 c. c. 25% $(NH_4)_2CO_3$ was added. After a second wash with aqueous 3% NaCl solution, the naphtha was evaporated in vacuo. Yield 91%.

|  | Original rosin | Polymerized rosin |
|---|---|---|
| Acid number | 164 | 138 |
| Drop melting point °C | 81 | 107 |
| Color | H | G |
| Percent unsaponifiable matter | 7 | 8.8 |

Example 10

To a solution of 207 g. I wood rosin in 623 g. benzene was added 104 g. 95% $H_2SO_4$ during 15 minutes at 80–84° F. with vigorous agitation. Agitation was continued at 80–84° F. for 0.5 hour. The benzene solution was then decanted from the sludge and shaken with 6 g. Darco (a commercial grade of activated carbon). After filtering to separate the Darco, the benzene solution was water washed, and the solvent evaporated in vacuo. The product had an acid number of 138, a drop melting point of 97° C. and a color of I.

Example 11

The procedure of Example 10 was duplicated except that the agitation after addition of the sulfuric acid was continued for 6 hours at 80–85° C. The product had an acid number of 115, a drop melting point of 111° C. and a color of F.

Example 12

To a solution of 1000 g. WW gum rosin in 2340 g. V. M. & P. naphtha was added 400 g. 95% $H_2SO_4$ with agitation during 25 minutes at 102–108° F. Agitation was continued for one hour at 108–110° F. 140 g. water was added during 10 minutes at 110–112° F. The naphtha solution was separated from aqueous $H_2SO_4$ and sludge and water washed using first 3000 c. c. aqueous 7% NaCl to which 180 c. c. 25% $(NH_4)_2CO_3$ solution was added, then a second wash with 2000 c. c. aqueous 7% NaCl. The naphtha was evaporated as previously. Yield 89%.

|  | Original rosin | Polymerized rosin |
|---|---|---|
| Acid number | 163 | 124 |
| Drop melting point °C | 83 | 120 |
| Color | WW | I |

Example 13

About 20% by weight of rosin oils and also rosin were removed from the product of Example 12 by means of vacuo distillation at 1–3 mm. pressure. The product had the following characteristics:

Acid number _____ 122
Drop melting point _____ °C __ 145
Color _____ I

From the foregoing, it will be seen that the present invention provides a highly improved lacquer for application to transparent wrapping sheets and an improved transparent wrapping sheet coated therewith. In particular, the present invention allows the use of polymerized rosin in this field without causing the objectionable development of haze in the coated wrapping sheet. The lacquer of the present invention yields a perfectly clear transparent film which is permanently haze-free. Numerous other advantages of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. A coating composition adapted to be applied to a transparent base and having the property of drying to a transparent permanently haze-free film and comprising from about 25 to about 60% of a cellulose derivative selected from the group consisting of cellulose ethers and cellulose esters, from about 20 to about 60% of a polymerized rosin having an acid number of at least about 100 and less than about 140, and a volatile organic solvent in sufficient amount to yield a readily flowing mixture capable of application in a thin even film.

2. A coating composition adapted to be applied to a transparent base and having the property of drying to a permanently haze-free film and comprising from about 25 to about 60% of a cellulose derivative selected from the group consisting of cellulose ethers and cellulose esters, and from about 20 to about 60% of a polymerized rosin having an acid number of from about 100 to about 135 said percentages being by weight and based on total solids, and a volatile organic solvent in sufficient amount to yield a readily flowing mixture capable of application in a thin even film.

3. A coating composition adapted to be applied to a transparent base and having the property of drying to a transparent permanently haze-free film and comprising from about 25 to about 60% of nitrocellulose, from about 20 to about 60% of a polymerized rosin having an acid number of from about 100 to about 135, and from about 5 to about 40% of a plasticizer, said percentages being by weight on total solids, and a volatile organic solvent in sufficient amount to yield a readily flowing mixture capable of application in a thin, even film.

4. A coating composition adapted to be applied to a transparent base and having the property of drying to a transparent permanently haze-free film and comprising from about 40 to about 50% of nitrocellulose, from about 30 to about 40% of a polymerized rosin having an acid number of from about 100 to about 135, and from about 10 to about 20% of a plasticizer, said percentages being by weight on total solids, and a volatile organic solvent in sufficient amount to yield a readily flowing mixture capable of application in a thin even film.

5. A coating composition adapted to be applied to a transparent base and having the property of drying to a transparent permanently haze-free film and comprising about 45.5% of 1/2 second nitrocellulose, about 36.3% of a polymerized rosin having an acid number of from about 100 to about 135, and about 18.2% of dibutyl phthalate, said percentages being by weight on total solids, and a volatile organic solvent in sufficient amount to yield a readily flowing mixture capable of application in a thin even film.

6. A transparent permanently haze-free article of manufacture comprising a transparent base which is insoluble in the usual lacquer solvents coated on at least one side with a transparent permanently haze-free film comprising from about 25 to about 60% of a cellulose derivative selected from the group consisting of cellulose ethers and cellulose esters and in intimate admixture therewith from about 20 to about 60% of polymerized rosin having an acid number of at least about 100 and less than about 140.

7. A transparent permanently haze-free article of manufacture comprising a transparent base which is insoluble in the usual lacquer solvents coated on at least one side with a transparent permanently haze-free film comprising from about 25% to about 60% of a cellulose derivative selected from the group consisting of cellulose ethers and cellulose esters and from about 20% to about 60% of a polymerized rosin having an acid number of from about 100 to about 135.

8. A transparent permanently haze-free article of manufacture comprising a transparent base which is insoluble in the usual lacquer solvents coated on at least one side with a transparent permanently haze-free film comprising from about 25% to about 60% of nitrocellulose, from about 20% to about 60% of polymerized rosin having an acid number of from about 100 to about 135, and from about 5% to about 40% of a plasticizer.

9. A transparent permanently haze-free article of manufacture comprising a transparent base which is insoluble in the usual lacquer solvents coated on at least one side with a transparent permanently haze-free film comprising from about 40% to about 50% of nitrocellulose, from about 30% to about 40% of polymerized rosin having an acid number of from about 100 to about 135, and from about 10% to about 20% of a plasticizer.

10. A transparent permanently haze-free article of manufacture comprising a transparent base which is insoluble in the usual lacquer solvents coated on at least one side with a transparent permanently haze-free film comprising about 45% of 1/2 second nitrocellulose, about 36% of polymerized rosin having an acid number of from about 100 to about 135, and about 18% of dibutyl phthalate.

11. A coating composition adapted to be applied to a transparent base and having the property of drying to a transparent permanently haze-free film and comprising from about 25 to about 60% of a cellulose derivative selected from the group consisting of cellulose ethers and cellulose esters, from about 20 to about 60% of a polymerized rosin having an acid number of from about 100 to about 140, from about 5 to about 40% of a plasticizer, said percentages being by weight on the basis of the total solids, a wax, and a volatile organic solvent in sufficient amount to yield a readily flowing mixture capable of application in a thin even film.

12. A coating composition adapted to be applied to a transparent base and having the property of drying to a transparent permanently haze-free film and comprising from about 25 to about 60% of a cellulose derivative selected from the group consisting of cellulose ethers and cellulose esters, from about 20 to about 60% of a polymerized rosin having an acid number of from about 100 to about 140, from about 5 to about 40% of a plasticizer, from about 1 to about 20% of a wax, said percentages being by weight and based on the total solids, and a volatile organic solvent in sufficient amount to yield a readily flowing mixture capable of application in a thin even film.

13. A transparent permanently haze-free article of manufacture comprising a transparent base which is insoluble in the usual lacquer solvents coated on at least one side with a transparent permanently haze-free film comprising from about 25 to about 60% of a cellulose derivative selected from the group consisting of cellulose ethers and cellulose esters, from about 20 to about 60% of a polymerized rosin having an acid number of from about 100 to about 140, from about 5 to about 40% of a plasticizer, said percentages being by weight on the basis of the total solids, and a wax.

14. A transparent permanently haze-free article of manufacture comprising a transparent base which is insoluble in the usual lacquer solvents coated on at least one side with a transparent permanently haze-free film comprising from about 25 to about 60% of a cellulose derivative selected from the group consisting of cellulose ethers and cellulose esters, from about 20 to about 60% of a polymerized rosin having an acid number of from about 100 to about 140, from about 5 to about 40% of a plasticizer, and from about 1 to about 20% of a wax, said percentages being by weight on the basis of the total solids.

ALFRED L. RUMMELSBURG.